United States Patent [19]

Kittrell et al.

[11] 4,089,930
[45] May 16, 1978

[54] PROCESS FOR THE CATALYTIC REDUCTION OF NITRIC OXIDE

[75] Inventors: James R. Kittrell, Amherst, Mass.; Donald L. Herman, Yardley, Pa.

[73] Assignees: New England Power Service Company, Westborough, Mass.; Northern Utilities Service Company, Newington, Conn.

[21] Appl. No.: 657,541

[22] Filed: Feb. 12, 1976

[51] Int. Cl.² .......................... B01J 8/00; C01B 21/00
[52] U.S. Cl. .................... 423/239; 252/439; 423/351
[58] Field of Search ...................... 423/239, 235, 351; 252/439

[56] References Cited

U.S. PATENT DOCUMENTS

| 3,563,912 | 2/1971 | Young | 252/439 |
| 3,850,846 | 11/1974 | Kravitz et al. | 252/439 |
| 3,857,921 | 12/1974 | Tamura et al. | 423/239 |
| 3,864,451 | 2/1975 | Lee et al. | 423/239 |
| 3,914,390 | 10/1975 | Kudo et al. | 423/239 |
| 3,933,979 | 1/1976 | Eisenloher et al. | 423/239 |
| 3,981,971 | 9/1976 | Saito et al. | 423/235 |

FOREIGN PATENT DOCUMENTS 2,411,888  9/1974  Germany .............................. 423/239

OTHER PUBLICATIONS

Chemical Abstracts, vol. 84, 1976, 84:34895v; 84:21719r.

Primary Examiner—O. R. Vertiz
Assistant Examiner—Eugene T. Wheelock
Attorney, Agent, or Firm—Thompson, Birch, Samuels & Gauthier

[57] ABSTRACT

Base metal catalysts are pretreated with selenium, sulfur or sulfur compounds. Subsequently, a gaseous stream comprising nitric oxide, oxygen and ammonia is passed over the pretreated catalysts. The nitric oxide is reduced to nitrogen and no nitrous oxide is formed.

7 Claims, 1 Drawing Figure

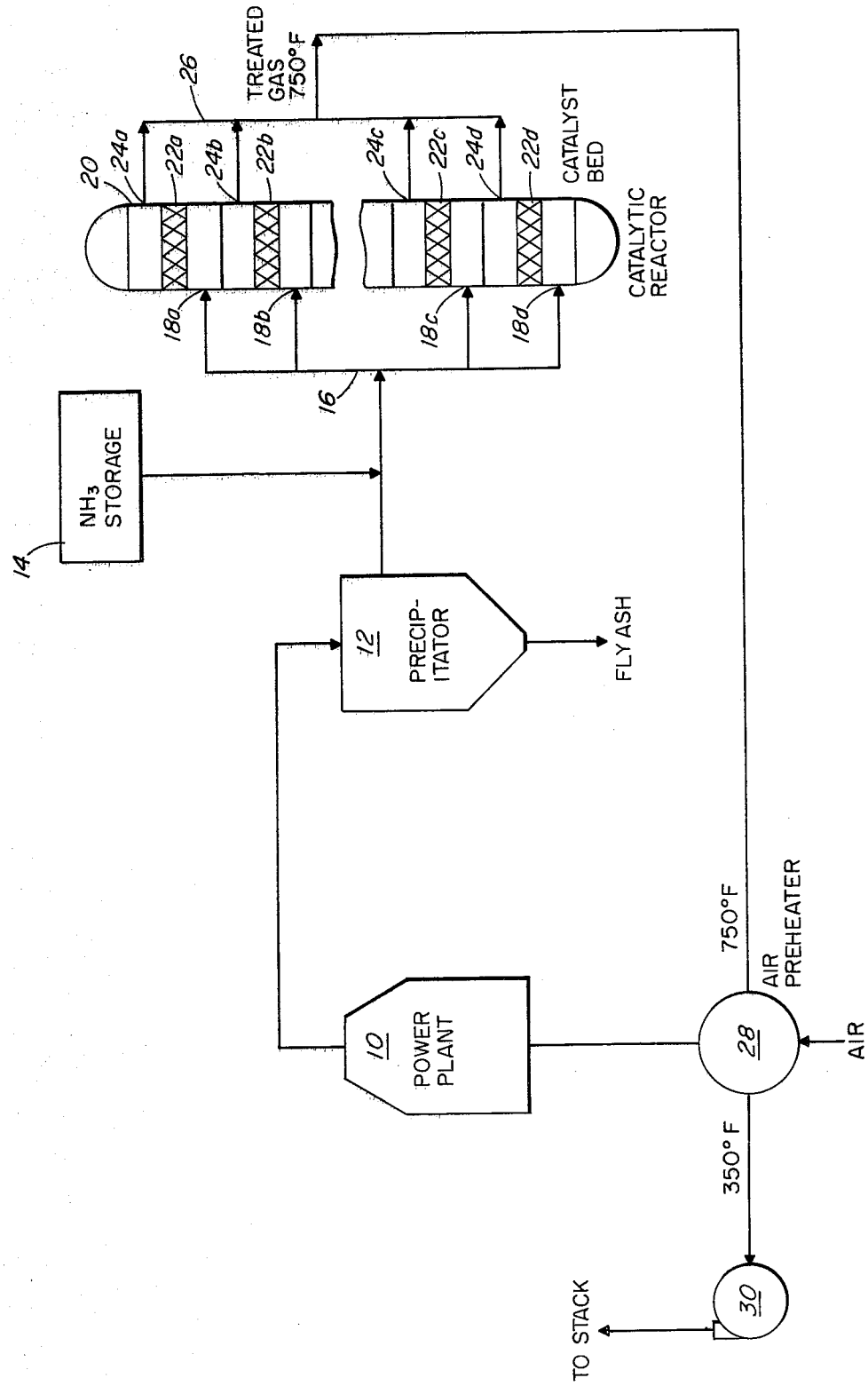

PROCESS FOR THE CATALYTIC REDUCTION OF NITRIC OXIDE

BACKGROUND OF THE INVENTION

Nitrogen oxides, particularly nitric oxide, are undesirable products of reaction which result when carbonaceous fuels are burned such as in power plant operations.

Various techniques have been proposed for removing nitric oxides from gaseous streams to prevent pollution of the atmosphere, such as absorption, scrubbing and catalytic conversion.

Catalytic reduction of nitric oxides with ammonia or hydrogen in the presence of nickel and oxides of iron and chromium has been proposed (U.S. Pat. No. 2,381,696; U.S. Pat. No. 3,008,796; and German Pat. No. 1,259,298). The reaction is exothermic and control of the temperature in the catalyst bed is difficult, so that combustion of the ammonia is likely to occur.

Removal of nitric oxides from tail gas streams of nitric acid plants has been attempted by reaction with ammonia, hydrogen, or methane over a catalyst consisting of a supported metal of the platinum group. Anderson et al, Ind. Eng. Chem. Vol. 53, p. 199 (1961); and Adlhart et al, Chem. Eng. Progra. Vol. 67, p. 73–78 (1971). With this method there has been difficulty in control of the exothermic reaction, which results in pressure surges and overheating of the reactor. Also, in some instances, hydrogen cyanide is produced as a by-product.

In power plant emissions, the gaseous effluent typically contains as the major source of pollutants sulfur oxides or sulfur dioxide and nitric oxides. It has been found possible to separate the sulfur dioxide from the effluent and to treat the sulfur dioxide separately. This results in an effluent primarily containing sulfur dioxide as less than 2000 ppm, nitric oxide, oxygen and nitrogen and water vapor.

The prior art methods for catalytically reducing nitric oxide with ammonia as a reducing gas experience problems with the temperature of operation required to maintain the efficiency of the catalyst employed, deterioration of the catalyst, controlling exothermic reactions and preventing the formation of by-products which are pollutants, particularly nitrous oxide.

The use of a base metal catalyst to reduce nitric oxide to nitrogen with ammonia in the presence of oxygen and sulfur dioxide has been suggested, German Pat. No. 1,259,298. However, the catalyst life is limited and no controls are provided for the prevention of the formation of nitrous oxide and the exothermic reaction is difficult to control. Further, in similar component systems for the reduction of nitric oxide to nitrogen with ammonia, the use of a copper promoted catalyst on a catalytic support such as alumina, silica or diatomacous earth is suggested, U.S. Pat. No. 3,008,796. The reaction rates are not such that such a process would be considered economically possible for the treatment of a gaseous stream such as from a power plant emission. The elimination or inhibition of the formation of undesirable by-products is not controlled.

SUMMARY OF THE INVENTION

The present invention is broadly directed to the catalytic reduction of nitric oxide to nitrogen with ammonia as a reductant. More particularly, the invention provides a high percent conversion of nitric oxide to nitrogen with ammonia while avoiding or minimizing the formation of undesirable by-products such as nitrous oxide. The invention is directed to the pretreatment of a base metal catalyst selected from the group consisting essentially of copper, iron, chromium, nickel, molybdenum, cobalt, vanadium, the lanthanides and the actinides or any combinations thereof with a nonmetallic element selected from Group VI A of the periodic system.

In a preferred embodiment, the base metal catalysts copper, vanadium and iron either alone or any combination thereof are pretreated with a sulfur compound and/or selenium. The treated catalyst is then employed for the reduction of nitric oxide to nitrogen in a component system of ammonia, oxygen and an inert gas.

In the catalytic reduction of nitric oxide to nitrogen in a multi-component system of nitric oxide, oxygen, ammonia and an inert gas several reactions are believed to occur. The more important reactions are:

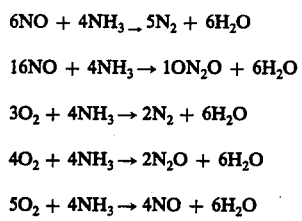

In a system of nitric oxide and oxygen with ammonia, to reduce the nitric oxide with or without sulfur dioxide added, using a noble metal catalyst, both nitrogen and nitrous oxide are formed.

In a system of nitric oxide, oxygen and a controlled amount of sulfur dioxide using a base metal catalyst, the nitric oxide is reduced to nitrogen with substantially no nitrous oxide formation. Where the amount of sulfur dioxide in the system is unknown, either no sulfur dioxide or no controlled amount of sulfur dioxide, both nitrogen and nitrous oxide are formed.

In the present invention, base metal catalysts are pretreated and for a system of nitric oxide and oxygen with ammonia using a base metal catalyst, substantially no nitrous oxide is formed. This pretreatment eliminates the necessity of controlling the amount of sulfur dioxide, if any, in the system to eliminate the undesirable by-product nitrous oxide when nitric oxide is reduced to nitrogen with ammonia using a base metal catalyst.

The method of the invention broadly comprises pretreating a base metal catalyst from the group consisting essentially of ferric oxides, vanadium oxides and copper oxides by contacting the catalysts with a pretreatment stream comprising a vaporizable sulfur compound such as dimethyl sulfide, hydrogen sulfide, sulfur dioxide, carbon disulfide or elemental sulfur; or selenium to impregnate the catalyst. Ammonia is blended with a gaseous stream comprising nitric oxide and oxygen to form a blended stream which contacts the pretreated catalyst. The nitric oxide is reduced to nitrogen with substantially no nitrous oxide formation. To promote the formation of metal sulfides on the catalyst or the deposition of sulfur, the pretreatment stream preferably comprises $H_2$ or $NH_3$. The pretreatment step is preferably conducted at temperatures between about 400° F. to 900° F. The time of pretreatment or exposure will depend upon the temperature used, and is generally between about 2 hours to 24 hours, preferably between 2 hours to 10 hours, the shorter duration at the higher temperatures. The composition of vaporizable sulfur compound or selenium compound in the pretreatment stream may be 0.5% to 10%, preferably 1% to 2%.

BRIEF DESCRIPTION OF THE DRAWING

FIG. 1 is a process flow diagram of the preferred embodiment of the invention.

DESCRIPTION OF THE PREFERRED EMBODIMENT(S)

A power plant, 800 mw capacity, is shown at 10, and emits a flue gas stream at between about 200° F. to 1,000° F., preferably between 300° F. to 700° F., say for example at 500° F. and at a rate of approximately 200 × 10⁶ cubic feet per hour. A representative composition of the flue gas is set forth below in Table I, it being understood that the composition will vary depending on operating conditions and the type of fuel being consumed.

TABLE I

| Comp. | Comp. of Flue Gas Vol. % | lb/hr |
|---|---|---|
| $CO_2$ | 14.5 | $1.512 \times 10^6$ |
| $O_2$ | 3.0 | $2.275 \times 10^5$ |
| $SO_2$ | 0.2 | $3.039 \times 10^4$ |
| $NO_x$ | 0.075 | $5.329 \times 10^3$ |
| Fly Ash | 0.2 | — |

The remainder is comprised of $N_2$ & $H_2O$.

The remainder is comprised of $N_2$ & $H_2O$.

The stream is discharged from the power plant 10 having the above composition and is introduced to a precipitator 12 where approximately 95% of the fly ash is removed. The stream is discharged from the precipitator 12 less the removed fly ash, and ammonia from a source 14 is blended as a reductant gas with the stream to form a blended stream. This blended stream flows to a manifold 16 where it is introduced into a catalytic reactor 20 through a plurality of inlets 18a–d. The ammonia flow rate is dependant on the ammonia-nitric oxide ratio. For this example, Table II lists a range of mole ratios and the associated amount of ammonia available for the subsequent catalytic reaction.

TABLE II

| $NH_3/NO$ mole ratio | lb $NH_3$/hr. |
|---|---|
| 0.7 | 2115.5 |
| 0.8 | 2417.7 |
| 0.9 | 2720.0 |
| 1.0 | 3022.1 |

The catalytic reactor comprises a plurality of catalytic beds 22a—d. The streams introduced flow through the catalytic beds where the following reaction primarily occurs.

$$6NO + 4NH_3 \rightarrow 5N_2 + 6H_2O$$

The catalyst volume is dependent upon the space velocity. Table III sets forth the cubic footage requirements of the catalytic bed in reference to the space velocity.

TABLE III

| Space velocity $hr^{-1}$ reactor conditions | Catalyst vol., $ft^3$ |
|---|---|
| 25,000 | 8376.9 |
| 50,000 | 4188.5 |
| 75,000 | 2792.3 |

TABLE III-continued

| Space velocity $hr^{-1}$ reactor conditions | Catalyst vol., $ft^3$ |
|---|---|
| 100,000 | 2094.2 |

The catalyst employed in this particular embodiment is 10% $V_2O_5$ on alumina such as available from Harshaw Chemical and designated VO301, which has been pretreated. The percent reduction of nitric oxide in the blended stream under the conditions set forth herein exceeds 80% and may be approximately 100% with no nitrous oxide formation. A representative composition discharged from the catalytic reactor 20 through outlets 24a–d and through manifold 26 is set forth in Table IV.

TABLE IV

| Comp. | Comp. of Reactor Exit Gas (after electrostatic precipitation) Vol. % |
|---|---|
| $CO_2$ | 14.5 |
| $O_2$ | 2.9 |
| $SO_2$ | 0.2 |
| $NO_x$ | 0.020 |
| Fly Ash | 0.01 |

This reduced stream at between about 300° to 700° F., say for example 500° F., is introduced into a heat exchanger 18 where it is cooled by incoming air to about 350° F. It is then discharged to the stack by a conventional fan 30.

The $V_2O_5$ on alumina is pretreated to ensure that there is substantially no nitrous oxide formed, whether or not there is sulfur dioxide present in the stream. The catalyst is contacted with a stream of 2% dimethyl sulfide and 2% hydrogen in helium at a temperature of between about 500° to 700° F., say for example 600° F., for a period of between about 4 to 8 hours, say for example 6 hours. After pretreatment, the catalyst is placed on supports for the beds 22a—d.

Other base metal catalysts which may be similarly pretreated are copper, iron, chromium, nickel, molybdenum, cobalt, or appropriate combinations thereof, normally supported on a high surface area material such as alumina, silica alumina, or zeolites.

In the pretreatment of the catalyst, other suitable compounds which may be used include hydrogen sulfide, sulfur dioxide, carbon disulfide or elemental sulfur; or selenium at operating conditions similar to those set forth above.

In an alternative embodiment, the invention may be utilized for NO removal from the exhaust of a turbine generator employing equipment functionally equivalent to that shown in the drawing. A turbine generator with a capacity of about 20 mw discharges an exhaust of about $30 \times 10^5$ cubic feet per hour. A representative composition of the exhaust is set forth below in Table V, it being understood that the composition will vary depending upon operating conditions and the type of fuel being consumed.

TABLE V

| Composition | Comp. of Exhaust Gas Vol. Frac. | lb/hr |
|---|---|---|
| $O_2$ | .16 | $16.42 \times 10^6$ |
| $SO_x$ | $28 \times 10^{-6}$ | 57.30 |
| NO | $114 \times 10^{-6}$ | 107.6 |
| CO | $5 \times 10^{-6}$ | 4.397 |

The stream discharged from the generator, having the above composition, is introduced into a catalytic reactor substantially identical to that shown in the drawing and described in reference to the preferred embodiment of the invention. More particularly, the catalytic reactor includes a plurality of catalytic beds in a column-like configuration disposed in a plurality of zones. A reductant gas, more particularly, ammonia, is blended with the exhaust gas stream and introduced through a manifold to a catalytic reactor at a temperature of between about 500° F. to 900° F., say for example 800° F. The ammonia-nitric oxide molar ratio may vary between 0.7 to 1.0. The following Table VI lists the mole ratios and required amount of ammonia necessary for the subsequent catalytic reaction.

TABLE VI

| $NH_3/NO$ Mole Ratio | lb. $NH_3$/hr |
|---|---|
| 0.7 | 42.72 |
| 0.8 | 48.82 |
| 0.9 | 54.93 |
| 1.0 | 61.03 |

The total catalytic volume is dependent upon the space velocity. The following Table VII sets forth the cubic footage requirements of the catalyst in reference to space velocity, which varies between about 25,000 $hr^{-1}$ to 100,000 $hr^{-1}$.

TABLE VII

| Space Vel. $Hr^{-1}$ Reactor Cond. | Catalyst Vol. $Ft.^3$ |
|---|---|
| 25,000 | 1257. |
| 50,000 | 628.4 |
| 75,000 | 418.9 |
| 100,000 | 314.2 |

The catalyst employed in this alternative embodiment is $V_2O_5$ supported on alumina, which is pretreated as described in the preferred embodiment. The percent reduction of nitric oxide under the conditions set forth herein is substantially 100% with substantially no nitrous oxide formation. A representative composition discharged from the catalytic reactor is set forth below in Table VIII.

TABLE VIII

| Comp. of Reactor Exit Gas | |
|---|---|
| Composition | Vol. Frac. |
| $O_2$ | .15 |
| $SO_x$ | $28 \times 10^{-6}$ |
| $NO_x$ | $50 \times 10^{-6}$ |
| CO | $5 \times 10^{-6}$ |

The following examples illustrate the suitability of the catalyst compositions when used in the inventive process.

EXAMPLE 1

Samples of six commercially available catalysts were used as received to reduce nitric oxide by ammonia in the absence of sulfur dioxide, as set forth in Table IX below.

TABLE IX

| Catalyst Type | Manufacturer | Identification |
|---|---|---|
| 10% CuO on alumina | Harshaw | Cu0803 |
| Cr promoted iron oxide | Girdler | G3A |
| Copper chromite | Girdler | G13 |
| 3% Pt on alumina | Matthey Bishop | MB30 |
| 10% $V_2O_5$ on alumina | Harshaw | VO301 |

TABLE IX-continued

| Catalyst Type | Manufacturer | Identification |
|---|---|---|
| 10% $V_2O_5$ on silica alumina | Harshaw | VO701 |

Approximately 3 grams of each catalyst was changed to individual ¼ inch diameter aluminum reactors and placed in a furnace such as a Lindberg Heavi-Duty furnace. A feed mixture comprising approximately 520 ppm $NH_3$, 600 ppm NO, 5000 ppm $O_2$, and the balance He was passed over these catalysts at a space velocity of 380 std. cc/gm-min. The results are set forth in Table X.

By comparison to the inlet NO level, it can be seen that substantial quantities of NO have been converted, but that the bulk of it has been converted to $N_2O$, an undesirable by-product, rather than to $N_2$, the desired product.

EXAMPLE 2

The catalysts of Example 1 were tested in a similar fashion, except approximately 2000 ppm of sulfur dioxide was added to the feed mixture of Example 1. The results obtained are set forth in Table XI. It can be seen from the table that the addition of sulfur dioxide to the feed of the non-noble metal catalysts has reduced the undesirable formation of $N_2O$ to zero, with $N_2$ being the only reaction product in these cases. The addition of sulfur dioxide did not inhibit the formation of $N_2O$ for the platinum catalyst however.

TABLE X

| | | PPM Product Gas Composition | |
|---|---|---|---|
| Catalyst Type | Temperature, °F | NO | $N_2O$ |
| 3% Pt on alumina | 431 | 11 | 392 |
| 3% Pt on alumina | 457 | 10 | 405 |
| 3% Pt on alumina | 506 | 46 | 374 |
| 3% Pt on alumina | 557 | 79 | 353 |
| 10% CuO on alumina | 430 | 79 | 119 |
| 10% CuO on alumina | 457 | 81 | 153 |
| 10% CuO on alumina | 507 | 119 | 252 |
| 10% CuO on alumina | 556 | 139 | 331 |
| Copper chromite | 430 | 181 | 108 |
| Copper chromite | 458 | 149 | 131 |
| Copper chromite | 507 | 187 | 194 |
| Copper chromite | 557 | 258 | 275 |
| Cr promoted iron oxide | 433 | 175 | 153 |
| Cr promoted iron oxide | 460 | 203 | 267 |
| Cr promoted iron oxide | 509 | 219 | 297 |
| Cr promoted iron oxide | 559 | 220 | 301 |
| 10% $V_2O_5$ on alumina | 432 | 44 | 55 |
| 10% $V_2O_5$ on alumina | 459 | 59 | 86 |
| 10% $V_2O_5$ on alumina | 508 | 70 | 42 |
| 10% $V_2O_5$ on alumina | 559 | 222 | 322 |
| 10% $V_2O_5$ on silica alumina | 433 | 220 | 59 |
| 10% $V_2O_5$ on silica alumina | 460 | 140 | 106 |
| 10% $V_2O_5$ on silica alumina | 508 | 83 | 93 |
| 10% $V_2O_5$ on silica alumina | 560 | 197 | 279 |

TABLE XI

| Catalyst Type | Temperature °F | Downstream NO | Concentration $N_2O$ |
|---|---|---|---|
| 3% Pt on alumina | 457 | 165 | 419 |
| 3% Pt on alumina | 506 | 131 | 404 |
| 3% Pt on alumina | 553 | 143 | 449 |
| 10% CuO on alumina | 455 | 455 | 0 |
| 10% CuO on alumina | 505 | 342 | 0 |
| 10% CuO on alumina | 557 | 91 | 0 |
| Copper chromite | 455 | 534 | 0 |
| Copper chromite | 506 | 477 | 0 |
| Copper chromite | 553 | 415 | 0 |
| Cr promoted iron oxide | 457 | 470 | 0 |
| Cr promoted iron oxide | 507 | 273 | 0 |
| Cr promoted iron oxide | 559 | 29 | 0 |
| 10% $V_2O_5$ on alumina | 458 | 63 | 0 |
| 10% $V_2O_5$ on alumina | 508 | 0 | 0 |
| 10% $V_2O_5$ on alumina | 560 | 0 | 0 |
| 10% $V_2O_5$ on silica alumina | 459 | 155 | 0 |

TABLE XI-continued

| Catalyst Type | Temperature °F | Downstream NO | Concentration $N_2O$ |
|---|---|---|---|
| 10% $V_2O_5$ on silica alumina | 510 | 19 | 0 |
| 10% $V_2O_5$ on silica alumina | 561 | 0 | 0 |

EXAMPLE 3

The catalysts of Example 1 were exposed to a stream of 2% dimethyl sulfide and 2% $H_2$ in helium for 6 hours at 600° F., and were tested at the conditions of Example 1 with no sulfur dioxide added to the feed to the reactors. Substantially no production of $N_2O$ was observed for the non-noble metal catalysts, with the only reaction product being $N_2$ and the downstream concentration of No and $N_2O$ being substantially the same as in Table XI. This pretreatment with dimethyl sulfide did not inhibit $N_2O$ formation with the platinum catalyst.

By pretreating the catalysts with the sulfur or selenium compounds, nitrous oxide formation is prevented whether or not sulfur dioxide is present in the stream containing the nitric oxide. My invention eliminates the requirement of controlling the amount of $SO_2$ remaining as a flue gas stream for the reduction of nitric oxide without nitrous oxide formation.

Having described our invention, what we claim is:

1. A method for the catalytic reduction of nitric oxide which includes:
    (a) blending ammonia with a gaseous stream comprising nitric oxide and oxygen, the ammonia added in an amount sufficient to react with the total amount of nitric oxide in the stream to form a blended stream;
    (b) placing the blended stream of step (a) in catalytic contact with a pretreated base metal catalyst at a temperature between about 300° F.-700° F. to reduce the nitric oxide to nitrogen while preventing the formation of nitrous oxide, the catalyst selected from the group consisting of copper, vanadium, iron and molybdenum and combinations thereof which catalyst has been contacted with a compound selected from the group consisting of sulfur, dimethyl sulfide, hydrogen sulfide and carbon disulfide and combinations thereof at a temperature of between about 400° F.-900° F. to form the pretreated catalyst.

2. A method of claim 1 wherein the catalyst is vanadium.

3. The method of claim 1 wherein the catalyst is chromium promoted iron oxide.

4. The method of claim 1 wherein the catalyst is copper.

5. The method of claim 1 which includes reducing at least ninety percent of the nitric oxide while preventing the formation of nitrous oxide.

6. The method of claim 1 wherein the catalyst is pretreated with a pretreatment stream of 2% dimethyl sulfide and 2% hydrogen in helium.

7. The method of claim 1, wherein the base metal catalyst pretreated is selected from the group consisting of copper, vanadium and iron.

* * * * *